Figure 1:
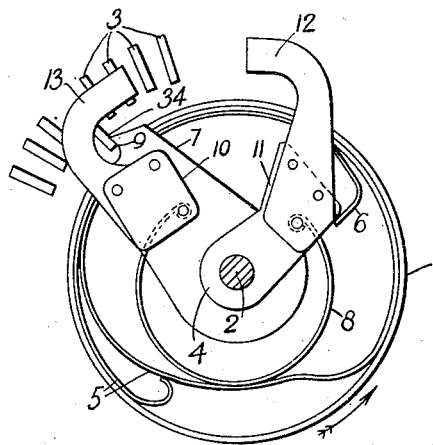

April 25, 1933.  R. G. GRIFFITH  1,905,090
CLUTCH MECHANISM
Filed Aug. 14, 1931

INVENTOR
RONALD G. GRIFFITH
BY R.C.Hopgood
ATTORNEY

Patented Apr. 25, 1933

1,905,090

UNITED STATES PATENT OFFICE

RONALD GEORGE GRIFFITH, OF CROYDON, ENGLAND, ASSIGNOR TO CREED AND COMPANY, LIMITED, OF CROYDON, ENGLAND

CLUTCH MECHANISM

Application filed August 14, 1931, Serial No. 557,083, and in Great Britain July 2, 1931.

This invention relates to mechanism as used in conjunction with selecting mechanism for setting a rotatable type-head in any one of a number of positions.

In printing telegraph apparatus to which the invention is applicable, for instance, a selecting mechanism operating under control of received signals is adapted to actuate one of a number of stop members circularly arranged and co-operating with a rotatable type-head which carries a number of type characters corresponding to the stop members. The rotatable type-head is rotated by a source of mechanical power and on selection and actuation of one of the stop members is arrested in a position at which a type character corresponding to that stop is opposite a printing hammer.

In printing apparatus of this class the rotatable type-head is usually driven from the source of mechanical power through a yielding friction clutch and an arm or other stop portion on the driven member of the clutch to which the type is attached, is adapted to engage the selected stop member and thus effect the arrest of the type-head; the friction clutch yielding whilst the type-head is maintained in the selected position. At high speeds of operation when the type-head is repeatedly released for rotation and re-arrested at different positions, the yielding friction clutch must transmit sufficient power to enable the type-head rapidly to acquire its rotary motion towards the next position on each release. Under these conditions considerable shock occurs at each arrest of the type-head causing rapid wear and tear, and also rebound and chatter of the type-head at the instant when printing is required to be effected, causing irregular and incorrect printing.

The object of the present invention is to provide an improved clutch mechanism for rotatable type-heads in cases of this nature whereby the shock and rebound on arrest of the rotating portion is considerably reduced.

According to a main feature, a rotatable type-head clutch mechanism comprises a rotatable driving member, a type-head frictionally driven by the driving member and having a number of type characters arranged thereon, a series of stationary stop members corresponding to the type characters, and a yielding stop-arm carried by the type-head and engageable with an actuated one of the series of stop members. For the purpose of the present invention, the yielding stop arm serves as a cushioning member between the type-head and the series of stop members. The stop-arm itself may be formed as a spring member but in the examples hereinafter shown a stop-arm is provided rotatable with the type head but connected thereto through a separate spring member.

According to a second feature, latching means is provided in combination with the yielding stop-arm as above mentioned, whereby, on actuation of a selected stop member and engagement therewith of the yielding arm, the type-head continues to advance slightly and the latching means engages with a stop member corresponding to the arrested position and prevents any backward movement of the type-head.

A further feature consists of forming the frictional driving means in the form of a coil clutch, and a spring arm for arresting the type-head as above described is also adapted to effect a reduction of the frictional driving force between the driving and driven members of the coil clutch.

Figure 2:
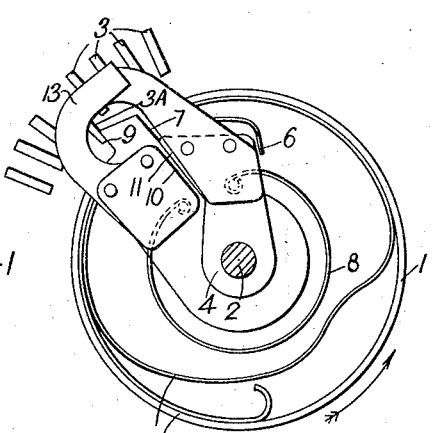
Figure 4:
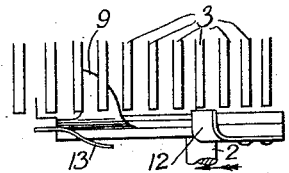
Figure 3:
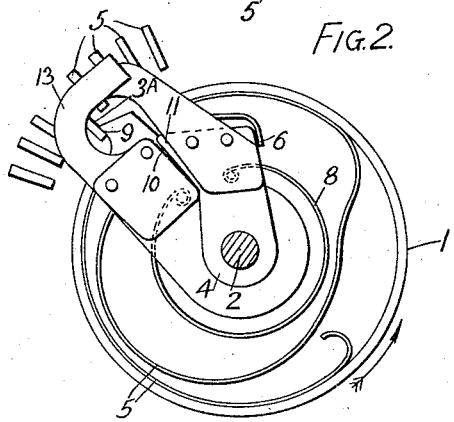
Figure 5:
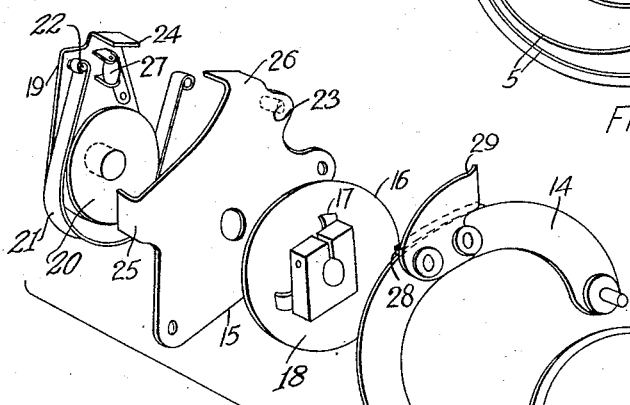
Figure 5:
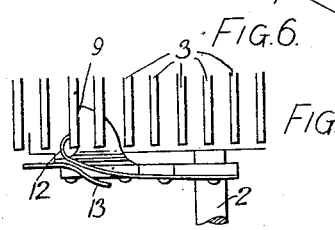
Figure 6:
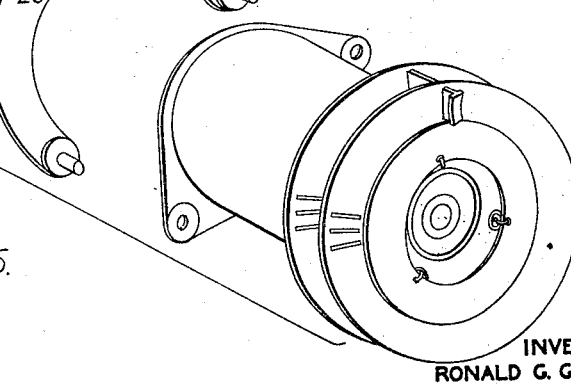

In the accompanying drawing, Figs. 1, 2 and 3 show a rotatable type-head clutch mechanism embodying all the features of the invention, each figure showing the various parts in different relative position. Figs. 4 and 5 show an end view of latching means more clearly. Fig. 6 shows an exploded perspective of a type-head and clutch assembly in which assembly the frictional driving means is formed as a plain friction clutch.

Referring to Figs. 1 to 5 inclusive, a cup-shaped driving member 1 is rotated on axis 2 by a source of mechanical power (not shown). Situated around and concentric with this driving member 1 is a stationary series of selectable stop members 3, each member on selection being independently movable in a radial direction to a position as shown by member 3A. Independently rotatable on axis 2 is a rotatable type-head (not shown) to which arm 4 is attached, which type-head carries a circular series of type characters corresponding to the series of stop members 3. The arrangement of the series of stop members for arresting the type head in any one of a number of positions is well known. Any convenient means may be employed for selecting and actuating the stop members, and any form of type-head such as a type-wheel, or a type-carrier having a number of independently movable type bars carried thereon, may be used.

The type-head arm 4 is driven from the driving member 1 of the clutch by a coiled spring band 5 attached at one end 6 to the type-head arm 4 and shaped as shown for a purpose hereinafter to be described; the coiled spring band 5 being adapted to make frictional contact with the inner periphery of the driving member 1. Independently movable on axis 2 is a stop arm 7 connected to the type-head arm 4 by a curved spring blade 8 which is adapted normally to maintain stop arm 7 in advance of type-head arm 4 in the direction of rotation, suitable means being provided to limit the motion of arm 7 relatively to arm 4. As will hereinafter appear, in the arrangement shown in Figs. 1 to 5, the spring blade 8 of itself is adapted to serve this purpose and other functions. The direction of rotation with the arrangement as shown in the drawing is contra-clockwise as indicated by the arrow, and the coiled spring 5 normally tends to drive the type-head arm in this direction. When a stop member 3 has been selected, it is interposed in the path of a tooth 9 on the stop arm 7. The shock of arresting the type-head is considerably reduced as energy is absorbed in straining spring blade 8. By suitably proportioning the strength of the coiled spring band 5 supplying the frictional driving power and that of the spring band actuating stop arm 7, the frictional driving force can be arranged to be just sufficient to carry the type-head arm 4 up to a position in which abutting faces 10 and 11 on the stop arm and type-head arm respectively, position the type-head for the printing of the selected character, in which position it is maintained by the frictional driving force on coiled spring 5.

In order to ensure that no rebound takes place on arrest of the rotating movement to cause incorrect positioning, the type head is preferably arranged with latching means, shown in Figs. 1 to 5 by a hooked spring catch member 12 fixed to the type head arm 4 and normally revolving clear of the ends of the stop members 3. A member fixed to stop arm 7 has a bent cam portion 13 which co-operates with the hooked spring portion of catch member 12. On arrest of the stop arm by a stop member 3, the type-head arm 4 continues to advance as previously described and just before coming to rest the catch member 12 engages with the cam portion 13 and is latched behind a stop member corresponding to its arrested position, in this case shown as the actuated stop member 3A. The normal position during rotation of the type-head is shown in Figs. 1 and 4, the position in the arrested condition being shown in Figs. 2 and 5. When the selected stop member returns to its normal position the stop arm 7 is released and advances under tension of spring blade 8. This withdraws the cam portion 13 from the latch member 12, which thereupon is free to rotate clear of the stop members.

The coiled spring band 5 as previously mentioned, is preferably shaped as shown in Figs. 1 to 3. The band is attached at 6 to the type-head arm 4, makes approximately half a turn following the internal contour of the driving member 1 in the direction of rotation, is then bent in towards the axis 2 for a further portion of a turn and then again opens out and forms approximately a three-quarter turn around the outside of the previous portions and with the outer surface of the band forming a frictional driving surface in contact with the internal surface of the driving member 1. The inbent portion of the coiled band 5 is adapted to engage with the spring blade 8 of stop arm 7 when the latter is released and the typehead is rotating. By this means the motion of the stop arm in advance of the type-head is limited as previously referred to and the pressure of blade 8 on coiled spring band 5 serves to increase the frictional driving force between the two friction clutch members 1 and 5. When the stop arm 7 is arrested, the spring blade 8 is drawn clear of the coiled spring band 5 as shown in Fig. 2 and the driving force of the clutch is reduced. The coiled spring 5 formed in the shape as described, is carried round still further by the frictional contact with driving member 1 in the direction of rotation to a position substantially as shown in Fig. 3, and in this condition the driving force of the clutch in the arrested position of the type-head is considerably reduced.

Fig. 6 shows a modified construction in which shock absorbing means is employed with a plain disc type of friction clutch, but in which the latching means is shown as a C shaped flat spring 14 arranged concentric with the axis of rotation of the clutch and fixed at both ends to the driven member 15 of the clutch, the driving member being represented by the disc 16 pressed against the driven member by the threearmed spring 17 retained in place by block 18 on the driving shaft. A stop arm member 19, loosely mounted on a sleeve 20 of the driven member 15 is connected to the latter by spring 21 attached by the ends thereof to suitable pins 22 and 23 on the stop arm member 19 and driven member 15, respectively, so as to maintain the stop arm member normally in a position in advance of the driven member. A tooth 24 on the stop arm member 19 is adapted to engage a selected stop member 3 as already described and the motion of the stop arm member 19 relatively to that of the driven member 15 is limited by projections 25 and 26 on the latter member; the direction of rotation of the clutch being contraclockwise as before. The stop arm member 19 also carries a cam projection 27 which is adapted to engage a cam plate 28 fixed to the mid-portion of the C spring 14, when the stop arm is in the advanced position relatively to the driven member. By this means a latching projection 29, also fixed to the mid-portion of the C spring 14, is maintained clear of the ends of the stop member 3 when the type head is being rotated by the clutch, but when the stop arm member 19 is arrested by a selected stop member the driven member 15 continues to advance, the spring 21 being strained in so doing, so as to cushion the arrest of a type carrier which arrest is effected by projection 26 on the driven member abutting the stop arm member and in this position of the driven member the cam plate 28 fixed to the C spring 14 is carried beyond the cam projection 27 on the stop arm member. The latching projection 29 is thus left free to be actuated slightly in an axial direction by the C spring to engage with the ends of the stop members and to latch against one of these members when the driven member has just abutted the stop arm member and prevent rebound and incorrect positioning of the type head. On the release of the stop member the stop arm advances and again moves latch projection 29 clear of the stop members.

What is claimed is:—

1. A rotatable type-head clutch mechanism comprising, a rotatable driving member, a type-head having a number of type characters arranged thereon and frictionally driven by said driving member, a stationary series of selectable stop members corresponding to said type characters, a yielding stop arm carried by said type-head and engageable with an actuated one of said series of stop members, and means controlled by the stop arm and rendered effective by the engagement thereof with an actuated stop member to reduce the frictional driving contact between the driving member and the type-head.

2. A rotatable type-head clutch mechanism comprising, a rotatable driving member, a type-head having a number of type characters arranged thereon and frictionally driven by said driving member, a stationary series of selectable stop members corresponding to said type characters, a stop arm independently movable on the axis of rotation of said driving member and engageable with an actuated one of said series of stop members, and a spring tending to maintain said stop arm in a position in advance of said type head in the direction of rotation.

3. A rotatable type-head clutch mechanism comprising, a cup-shaped driving member, a type-head having a number of type characters arranged thereon, a stationary series of stop members, a coiled spring band attached at one end to said type-head and frictionally engaging with the internal surface of said driving member, and a yielding stop arm carried by said type-head and engageable with an actuated one of said series of stop members.

4. A rotatable type-head clutch mechanism comprising, a rotatable cup-shaped driving member, a type-head having a number of type characters arranged thereon, a stationary series of stop members, a coiled spring band attached at one end to said type head and frictionally engaging with the inner surface of said driving member, a stop arm independently movable on the axis of rotation of said driving member and engageable with an actuated one of said series of stop members, and a spring tending to maintain said stop arm in a position in advance of said type-head in the direction of rotation.

5. A rotatable type-head clutch mechanism comprising, a rotatable cup-shaped driving member, a type-head having a number of type characters arranged thereon, a coiled spring band attached at one end to said type-head and frictionally engaging with the internal surface of said driving member, a stationary series of selectable stop members corresponding to said type characters, an arm independently movable on the axis of rotation of said driving member, and a curved spring blade tending to maintain the stop arm in a position in advance of said type head and adapted in this position to bear on the inner surface of said coiled spring band for increasing the frictional driving contact during rotation by said driving member and on arrest of said stop arm to withdraw and reduce the frictional driving contact thereof.

6. A rotatable type-head clutch mechanism comprising, a rotatable driving member, a type-head having a number of type characters arranged thereon, a stationary series of selectable stop members corresponding to the type characters, a yielding stop arm carried by said type-head and engageable with an actuated one of said series of stop members, and latching means carried by said type-head and engageable with a stop member to latch the type head in the selected position on arrest of said yielding stop arm.

7. A rotatable type-head clutch mechanism comprising, a rotatable driving member, a type-head having a number of type characters arranged thereon, a stationary series of selectable stop members corresponding to the type characters, a yielding stop arm carried by said type-head and engageable with an actuated one of said series of stop members, a latching member carried by said type-head and engageable with a stop member to latch the type-head in a selected position, and cam means carried by said yielding stop arm and co-operating with said latching member to bring the latching member into operative relation with the stop members only in the arrested condition of said stop arm.

In witness whereof I hereunto subscribe my name this ninth day of July, 1931.

RONALD GEORGE GRIFFITH.

DISCLAIMER 1,905,090.—*Ronald George Griffith*, Croydon, England. CLUTCH MECHANISM. Patent dated April 25, 1933. Disclaimer filed October 11, 1934, by the assignee, *Creed and Company, Limited*.

Hereby enters this disclaimer to that part of claim 2 which is in the following words, to wit:

"A rotatable type-head clutch mechanism comprising, a rotatable driving member, a type-head having a number of type characters arranged thereon and frictionally driven by said driving member, a stationary series of selectable stop members corresponding to said type characters, a stop arm independently movable on the axis of rotation of said driving member and engageable with an actuated one of said series of stop members, and a spring tending to maintain said stop arm in a position in advance of said type head in the direction of rotation."

[*Official Gazette October 30, 1934.*]